(12) United States Patent
Kesarwani et al.

(10) Patent No.: US 10,372,572 B1
(45) Date of Patent: Aug. 6, 2019

(54) PREDICTION MODEL TESTING FRAMEWORK

(71) Applicant: Amazon Technologies, Inc., Seattle, WA (US)

(72) Inventors: Nitin Kesarwani, Seattle, WA (US); Sharon Xuelun Yang, Seattle, WA (US); Wei Huang, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 209 days.

(21) Appl. No.: 15/365,852

(22) Filed: Nov. 30, 2016

(51) Int. Cl.
*G06F 11/26* (2006.01)
*G06N 7/00* (2006.01)

(52) U.S. Cl.
CPC ........ *G06F 11/261* (2013.01); *G06N 7/005* (2013.01)

(58) Field of Classification Search
CPC ...... G06F 11/261; G06F 11/263; G06N 7/005
See application file for complete search history.

(56) References Cited

U.S. PATENT DOCUMENTS

| | | | | |
|---|---|---|---|---|
| 7,937,685 B2 * | 5/2011 | Weil | ........................... | G06F 8/71 705/323 |
| 2002/0127529 A1 * | 9/2002 | Cassuto | ................... | G09B 5/02 434/335 |
| 2005/0097207 A1 * | 5/2005 | Gluhovsky | ......... | H04L 41/0681 709/224 |
| 2009/0106178 A1 * | 4/2009 | Chu | ..................... | G06N 99/005 706/14 |
| 2016/0125292 A1 * | 5/2016 | Seo | ....................... | G06N 99/005 706/12 |
| 2016/0357443 A1 * | 12/2016 | Li | ........................... | G06F 3/065 |
| 2017/0339069 A1 * | 11/2017 | Larsson | ................ | G06F 9/5061 |

* cited by examiner

*Primary Examiner* — Yolanda L Wilson
(74) *Attorney, Agent, or Firm* — Robert C. Kowert; Meyertons, Hood, Kivlin, Kowert & Goetzel, P.C.

(57) ABSTRACT

A prediction model testing system includes a test environment that is used to test a prediction model under test (PMUT). A metrics collector in a production environment collects and stores production metrics data generated from computing resources in a production environment. A production predictor in the production environment generates production predictions for the metrics, using a production prediction model. A test manager may make the production metrics data available in a test environment. Test predictions are generated in the test environment from the metrics data using the PMUT. The test manager may then calculate respective prediction errors of the production prediction model and the PMUT, and generate a report indicating the differences between the two sets of prediction errors. The report may be used by the test management system to determine whether a test of the PMUT was successful.

20 Claims, 10 Drawing Sheets

COMPARISON OF
BASELINE PREDICTION MODEL: M1
TO
TEST PREDICTION MODEL: M2
702

METRIC 704: Page Swaps

|  | M2 Errors | | M1 Errors | | M2 to M1 |
|---|---|---|---|---|---|
| Time: | Error | In-Band | Error | In-Band | |
| 710 | 712 | 714 | 716 | 718 | 719 |
| 100 | 0 | Y | 0 | Y | 0 |
| 102 | 14 | N | 20 | N | (6) |
| 102 | 1 | Y | 6 | N | (5) |
| 103 | (1) | Y | (3) | Y | (2) |

⋮

SUMMARY 720

| | |
|---|---|
| M2 Avg Error 722: | 1.2 |
| M2 Max Error 724: | 20 |
| M1 Avg Error 726: | 2.5 |
| M1 Max Error 728: | 32 |
| M2 in band % 730: | 93% |
| M1 in band % 732: | 77% |

PREDICTION MODEL TESTING FRAMEWORK

BACKGROUND

A service provider may lease to a client portions of computing resources that the service provider manages in a service provider network. The service provider manages the operation of the computing resources to allow the resources to be efficiently and securely shared by multiple customers. As part of its management, the service provider may collect and track usage and performance metrics generated from the computer resources. In addition, the service provider may use prediction models to make predictions about the metrics at particular times in the future. For example, a prediction model may be used to predict the storage utilization for a storage resource at a time in the future. Such information may be used by a client of the storage resource to gradually scale the storage resource. The service provider may allow clients to use its prediction models through a prediction service offered by the service provider.

The service provider may operate the prediction service based on a prediction model in a production environment. From time to time, the service provider may modify the prediction service by updating the prediction model or replacing it with a new prediction model. However, it is generally difficult to determine how a new prediction model will perform in an actual production environment using real world metrics data. For one thing, an evaluation of prediction model performance is not simply a matter of correctness. Moreover, it may be desirable in some systems that a new prediction model does not generate predictions that are drastically different from the current prediction model in the production environment. Further, a new model may need to be observed over a long period of time under realistic operating conditions. For this reason, the performance evaluation is not a step that is easily incorporated into a traditional software testing platform. These issues cause difficulties in the testing of the prediction service, adding to both the time and cost needed for the testing process.

BRIEF DESCRIPTION OF THE DRAWINGS

FIG. 7 illustrates a report generated by a prediction model testing system, according to some embodiments.

Figure 1:
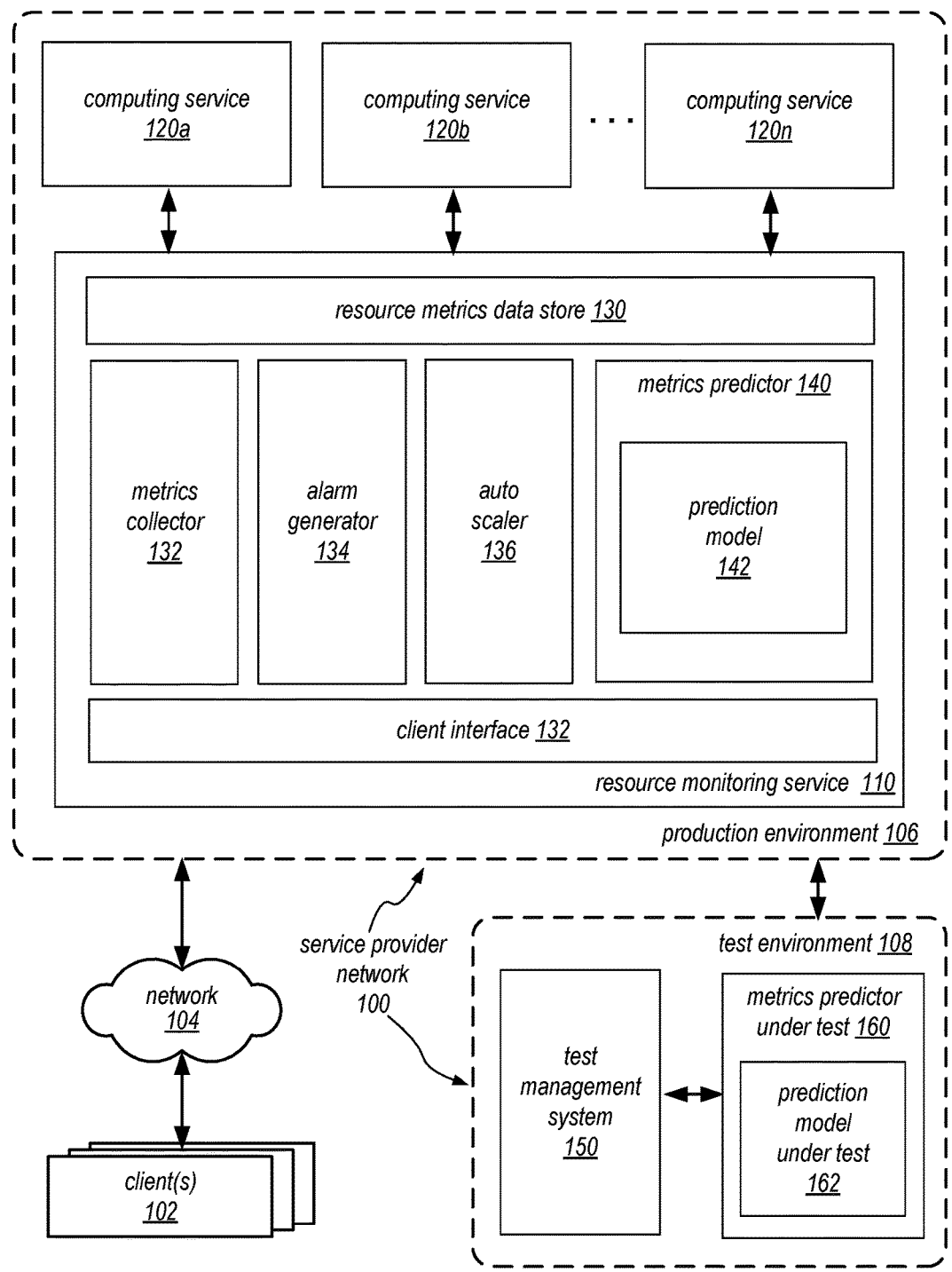
FIG. 1 is a block diagram illustrating an example computer system that implements prediction model testing, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of prediction model testing systems are disclosed herein for evaluating a prediction model used by a prediction service. A prediction service may operate in a production environment to make predictions for one or more variables. For example, a prediction service may collect performance and usage metrics data from computer resources as time-series data and generate a series of predictions for the metrics for a fixed time horizon (e.g., a two-hour forecast horizon). A prediction system may use a prediction model, which encapsulate a function or an algorithm to determine an expected value of a variable in the future based on a set of input variables. The prediction model may be implemented as one or more software modules along with one or more parameters that can be tuned.

As the prediction service evolves over time through development, the prediction model may also be updated. However, the proper testing of a new prediction model presents a number of difficulties. One difficulty relates to the task of consistently gathering a suite of test input data that provides sufficient coverage for testing. Another difficulty stems from the lacks objective measures for the performance of prediction models. In addition, the proper evaluation of a prediction model may require that the model be run for long periods of time, during which time other software code associated with the prediction system must remain fixed. For some prediction systems, it may be desirable that a new prediction model does not generate predictions that are drastically different from the production prediction model in the production environment.

Embodiments of a prediction model testing system are disclosed. The testing system includes a test environment that operates alongside a production environment running a prediction service. The production environment may capture and store usage or performances metrics data for computing resources operating in the production environment. The test environment may implement processes that allow portions of the metrics data in the production environment to be accessible in the test environment. In some embodiments, the metrics data may be copied to the test environment. The metrics data may be used as input data to test the performance of a prediction model under test (PMUT) in the test environment. The results that are generated by the PMUT may be stored, and a set of test prediction errors may be determined from the PMUT results and the actual observed metrics data corresponding to the predictions. The test prediction errors may be compared with production prediction errors that are determined from predictions made by the production prediction service in the production environment. The prediction errors from the PMUT and the production prediction model may be compared, and the difference generated in a report. The report that can be used to evaluate the performance of the PMUT. The prediction model testing process described herein may be implemented as a testing stage in a larger software testing process for the prediction service. The prediction model testing process may be implemented such that it does not modify either the metrics data nor the prediction data in the production environment.

FIG. 1 is a block diagram illustrating an example computer system that includes prediction model testing system, according to some embodiments. The system may include a service provider network 100 and one or more clients 102. The service provider network 100 may provide computing resources via one or more computing services 120a-n to clients 102 over network 104. The service provider network may be separated into a production environment 106 and a test environment 108. The production environment 106 may comprise computing resources that are used for normal operations of the service provider network 100. The test environment 108 may comprise computing resources that are used to perform certain tests using in an environment that is similar to the production environment 106. For example, the test environment 108 may be used to test particular software modules, hardware modules, or configuration data or settings before they are deployed to the production environment 106.

The service provider network 100 may be operated by an entity to provide one or more services, such as various types of cloud-based computing or storage services, accessible via the Internet and/or other networks to clients 102. Service provider network 100 may include numerous data centers hosting various resource pools, such as collections of physical and/or virtualized computer servers, storage devices, networking equipment and the like, needed to implement and distribute the infrastructure and services offered by the service provider network 100. In some embodiments, service provider network 100 may provide computing resources. These computing resources may in some embodiments be offered to clients 102 in units called "instances," such as virtual compute instances.

Virtual compute instances are one example of virtual computing resources. The virtual computing resources may be hosted on a virtualization host. A virtualization host may be one or more physical computing devices. The physical computing devices are an example of physical computing resources. A virtualization host may include a virtualization management module capable of instantiating and managing a number of different client-accessible virtual computing resources. The virtualization management module may include, for example, a hypervisor and an administrative instance of an operating system, which may be termed a "domain-zero" or "dom0" operating system in some implementations. The dom0 operating system may not be accessible by clients on whose behalf the virtual computing resources are run. The dom0 operating system may be responsible for various administrative or control-plane operations of the service provider, including for example capturing usage and performance metrics data from the virtual computing resources and the physical computing resources.

An instance in the production environment 106 may comprise one or more servers with a specified computational capacity (which may be specified by indicating the type and number of CPUs, the main memory size, and so on) and a specified software stack (e.g., a particular version of an operating system, which may in turn run on top of a hypervisor). One or more different computing devices may be used singly or in combination to implement the instances on the virtualization host. The computing devices may include general purpose or special purpose computers, storage devices, network devices and the like. The instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client applications. Different types of instances may be implemented in the production environment 106. Different instances may have different numbers of virtual CPU cores, and different amounts of memory, cache, storage and/or networking capacity, as well as any other performance characteristic. Configurations of instances may include their location, in a particular data center, availability zone, geographic, location, etc., and (in the case of reserved compute instances) reservation term length.

The clients 102 may encompass any type of client configurable to submit requests to the service provider network 100. For example, a given client 102 may include a suitable version of a web browser, or may include a plug-in module or other type of code module configured to execute as an extension to or within an execution environment provided by a web browser. Alternatively, a client 102 may encompass an application such as a dashboard application (or user interface thereof), a media application, an office application or any other application that may make use of the computing resources to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 102 may be configured to generate network-based services requests according to a Representational State Transfer (REST)-style network-based services architecture, a document- or message-based network-based services architecture, or another suitable network-based services architecture. In some embodiments, a client 102 (e.g., a computational client) may be configured to provide access to a computing service 120 in a manner that is transparent to applications implemented on the client 102 utilizing computational resources provided by the computing service 120.

The clients 102 may convey network-based services requests to the service provider 100 via network 104. In various embodiments, network 104 may encompass any suitable combination of networking hardware and protocols necessary to establish network-based communications between clients 102 and service provider network 100. For example, a network 104 may generally encompass the various telecommunications networks and service providers that collectively implement the Internet. A network 104 may also include private networks such as local area networks (LANs) or wide area networks (WANs) as well as public or private wireless networks. For example, both a client 102 and the service provider network 100 may be respectively provisioned within enterprises having their own internal networks. In such embodiments, the network 104 may include the hardware (e.g., modems, routers, switches, load balancers, proxy servers, etc.) and software (e.g., protocol stacks, accounting software, firewall/security software, etc.) necessary to establish a networking link between the client 102 and the Internet as well as between the Internet and service provider network 100. In some embodiments, clients 102 may communicate with service provider network 100 using a private network rather than the public Internet.

The computing services 120 offered by the service provider network 100 may include a variety of types of services that allows clients 102 to use computing resources in the service provider network 100 for a variety of purposes. These computing services 120 can, for example, provide access to generic compute instances. Computing services 120 can also provide access to specialized compute instances with specialized functionality, such as routers, domain name systems (DNSs), load balancers, desktop virtualization servers, and the like. The computing services 120 may include various types of storage services that expose different types of storage access interfaces, including block-based storage services, relational database services, NoSQL database services, file system services, and the like. Computing services 120 may also include services that provide functionalities of commonly used software modules, which can be used in conjunction with other software to implement larger systems. For example, computing services 120 may include queuing services, notification services, logging services, key storage and management services, and the like. The computing services 120 may include services that implement larger systems with sophisticated functionality, such as machine learning, identity management, software development environments, multi-tenant containers for hosting software tenants, and the like. The computing services 120 may be standard services provided by the service provider, or services implemented by third parties on top of the standard services. The computing services 120 generally operate on computing resources of the service provider network 100, and may be controlled and configured by clients 120 via various interfaces such as graphical user interface (GUI) (e.g., as part of an administration control panel or web site) and/or as a programmatic interface such as an Application Programming Interface (API). As the computing services 120 operate on the service provider's computing resources, usage or performance metrics data may be generated and captured.

In some embodiments, service provider network 100 may include a resource monitoring service 110. Resource monitoring service 110 may track and provide client access to various metrics data captured from the operation of computing services 120 on the service provider's computing resources. The generated metrics may be collected from the computing resources via a metrics collector 132. The metrics collector 132 may operate as a centralized process that periodically polls the computing resources in the service provider network 100 for metrics data. In some embodiments, the metrics collector 132 may rely on processes operating on the computing resources themselves, which may push metrics data back to the metrics collector 132. The collected metrics may be stored in a resource metrics data store 130, which may be implemented as a database, a set of log files in a file system, or another type of suitable storage system. Metrics data may be maintained on the resource metrics data store 130 for a specified period of time, before they are archived or discarded.

A metric may represent a type of data that can be captured from a computing resource. The metric may be represented as time-series data comprising a set of data points that are observed at regular time steps by a periodic polling process. For example, a metric may indicate the CPU utilization of a compute instance, captured in one-minute intervals. As another example, a second metric may indicate the latency of a load balancing instance in the service provider network 100. A metric may be associated with a name and a namespace, or one or more other dimensions, which may be used to uniquely identify a metric across a plurality of clients and computing resources. A metric may be part of a standard set of metrics defined by the service provider, or a custom metric defined by a client. For example, a client may define a custom metric that tracks the number of calls made to a client-specific API. The resource monitoring service 100 may monitor the metrics and make the collected results available to a client.

The resource monitoring service 110 may allow clients 102 to create and manage alarms based on the metrics. The resource monitoring service 110 may include an alarm generator 134 that maintains a plurality of enabled alarms. Alarms in the resource monitoring service 110 may be defined to trigger in response to certain alarm conditions. The conditions may depend on, for example, metrics data for certain computing resources are collected via the metrics collector 132. In one example, if the value of a metric exceeds a given threshold is detected for a specified number of time periods, an alarm is triggered. Alarm conditions may also depend on other data, such as data captured through other means, user actions, data that is generated based on the metrics data, the current time, or the like. When the alarm conditions are met, the alarm generator 134 may generate an associated alarm. The alarm may be sent to a registered list of interested modules or entities, which may perform certain actions in response to the alarm. In some embodiments, the service provider network 100 may include a notification service through which the alarm is posted. In addition, the alarm generation module 134 may generate log triggered alarms. The alarm log may be made available to the service provider or the clients 102 via one or more interfaces such as GUIs, APIs, or more sophisticated analysis tools.

Different actions may be performed in response to an alarm. In some embodiments, the resource monitoring service 110 may be configured to perform certain actions based on generated alarms. For example, the service provider network 100 may be configured to generate user notifications based on generated alarms. A client may specify that when a certain alarm is generated, a notification such as an email or text message is transmitted to an email or text address. For some alarms, a notification may be sent to an administrator in the service provider network 100. In addition, the notifications may be sent via a callback defined by an API exposed by the service provider network 100, such that registered software modules can receive these notifications. The software receiving these notifications may take appropriate actions programmatically, depending on the notification.

In some embodiments, the resource monitoring service 110 may implement an auto scaler 136. The auto scaler 136 may be implemented as part of the resource monitoring service 110 or separate from the resource monitoring service 110. The auto scaler 136 may provide an auto scaling function for a group of compute instances that are provided to a client 102, based on an auto scaling policy. For example, auto scaling may be used to ensure that a client's application is assigned a sufficient number of instances to handle the application's current or expected load. A client 102 may define an auto scaling group for the client application, which may specify a minimum and a maximum number of instances in the group. As another example, a client 102 may specify a minimum and maximum storage capacity for a particular auto scaling group of storage resources. The client 102 may then define an auto scaling policy that specifies the conditions under which computing resources are added to or removed from the group. In some cases, the auto scaling policy may specify that certain computing resources are reconfigured under certain conditions. These conditions may be specified as alarms based on metrics collected from instances in the current auto scaling group. In this manner, the resource monitoring service 110 may adjust the auto scaling group programmatically, depending on the changing operational metrics of the client application.

In some embodiments, the resource monitoring service 110 may implement a client interface 132. Client interface 132 may be configured to process incoming requests received from clients 102 and provide output back to the clients 102. For example, collect metrics data may be made available to a client 102 via the client interface 132. The metrics data may be presented to the client 102 in via a variety of channels, such as GUIs, APIs, log files, or more sophisticated analysis tools. The client interface 132 may also allow clients 102 to manage and configure operations of the resource monitoring service 110. For example, the client interface 132 may present a GUI to a client 102 to allow the client to define one or more metrics to be tracked, configure the parameters of the tracking, and define one or more alarms based on the metrics. The client interface 132 may be a network-based interface and may be implemented as one or more GUIs or APIs. In some embodiments, client interface 132 may be implemented as part of a frontend module or component dispatching requests to the various other components, such as the alarm generator 134, the resource metrics data store 130, or the metrics predictor 140.

The resource monitoring service 110 may implement a metrics predictor 140, which may be used to analyze collected metrics data and generate predictions for particular metrics in the future. The predictions may be made based on one or more prediction models 142 and the set of metrics data stored in the resource metrics data store 130. A prediction model may encapsulate a function or an algorithm to determine an expected value of a variable in the future based on a set of input variables. For example, a neural network may be used to implement a prediction model. The prediction model 142 may a time-series prediction model that makes predictions based on historical data stored in a time series of data points. For example, the prediction model 142 may comprise an autoregressive integrated moving average (ARIMA) model. In some examples, the prediction model 142 may employ an exponential smoothing method such as the Holt-Winters forecasting method. In some cases, the prediction model 142 may generate prediction limits for an expected value to capture an uncertainty associated with a prediction value. For example, the prediction model 142 may generate a prediction band around an expected value. The prediction band may be selected such that the observed value of a metric is expected to fall within the prediction band, by a certain probability. The prediction model 142 may be implemented as one or more software modules along with one or more parameters that can be tuned. The model parameters may be tuned manually or programmatically. A programmatic tuning of the model parameters may occur before the prediction model 142 is used on production data, during an initial training period. Alternatively, programming tuning may occur on a continuous basis as the prediction model is used with the production data.

The prediction of a metric may occur repeatedly and regularly in regular time steps as new observations of metrics data are received. Each prediction may produce an expected value of a metric at a particular time in the future from the time of the prediction, for example, 10 time steps from the current time. In this way, the prediction process may operate in parallel with the metrics monitoring process, maintaining a prediction time horizon of a certain number of time steps ahead in the future. In some cases, the prediction time step may be the same length as the observation time step for a tracked metric, such that each new observation of the metric is used to produce a new prediction of the metric. Predictions generated by the metrics predictor 140 may be stored in the resource metrics data store 130.

The metrics predictor 140 may receive input from the clients 102 to configure the predictions of metrics. The metrics predictor 140 may provide output the clients 102 regarding the results of the predictions. The input and output may be communicated via the client interface 132, and may be communicate in any formats, such as GUIs, APIs, log files, or one or more analysis tools. In particular, the metrics predictor 140 may include analysis tools to generate statistics from the predictions. The metrics predictor 140 may also render graphs of the collected metrics, the prediction of the metrics, and other statistical data, which may be provided to clients 102 via GUIs. The metrics predictor 140 may also perform certain analysis and provide expert recommendations to clients 102 based on the collected metrics, predictions, and/or statistics. For example, the metrics predictor 140 may determine that the predicted latency of a certain computing service 120 will be unacceptably high for a period of time in the future, and recommend an upgrade of the instances supporting the service 120 a particular date.

Like the collected metrics, the predictions of the metrics may be used to implement alarms. An alarm may be defined such that it is triggered when the predicted value of a metric at a certain time horizon exceeds a set threshold. For example, a client 102 may communicate with the alarm generator 134 to create an alarm that is triggered when the predicted storage utilization of a storage device exceeds 90% of a provision limit for three consecutive prediction time steps. The alarm may cause a warning message to be sent to a client 102, or cause an auto scaling event to occur, or both. In this manner, these prediction-based alarms allow actions to be taken to remedy a potential problem with computing resources before the problem actually materializes.

In another example, an alarm may be created that is triggered when an actual observation of metrics data falls outside the prediction band for that observation. For example, the predictor 140 may predicted that the CPU utilization at a particular time will be between 50% to 60%, and if the observed CPU utilization at that time outside of that 50% to 60% prediction band, the alarm generator 134 may generate an alarm. Such outlier detection alarms are useful for detecting usual activity on the computing resources.

A test environment 108 may operate alongside the production environment 106 to allow developers and testers to conduct tests for particular software modules, hardware modules, or configuration data or settings before they are deployed to the production environment 106. The test environment 108 may replicate some of the computing resources and/or configuration settings of the production environment 106. In some embodiments, the test environment 108 may be dynamically updated to mirror some of the computing resources and/or configuration settings of the production environment 106.

In some embodiments, the test environment 108 may be precluded from interacting or affecting the production environment 106 by operational settings or policies. For example, in some embodiments, the test environment 108 may be precluded from modifying data in the production environment 106. In some embodiments, certain software modules in the test environment 108, for example software that are being tested, are precluded from executing in the production environment 106. In some embodiments, the computing resources in the production environment 106 and test environment 108 may be located in to separate virtual networks, such that they cannot directly access or even see the computing resources in the other network. Access to the test environment 108 may be limited to certain developers and testers.

The test environment 108 may include a test management system 150, which may control aspects of the test environment 108. The test management system 150 may comprise one or more software modules implemented on one or more hardware computing resources, configured to carry out certain tasks specific to the test environment 108. For example, the test management system 150 may automate a regular build process to convert developer code into executable modules, which can be tested. The test management system 150 may also maintain test cases and allow testers to create and configure the test cases for different modules that are being tested in the test environment 108. The test management system 150 may also implement test data generation processes or test data feeds to populate the test environment 108 with test data. The test management system 150 may also include one or more user interface modules that allow users to control, configure, and monitor the testing process. These user interfaces may also allow developers to visualize the results of testing, and generate reports or data that may be used by developers to revise the code for the modules.

The test environment 108 may include software that is currently under testing, such as the metrics predictor under test 160. The metrics predictor under test 160 may be a developmental version of the metrics predictor 140 in the production environment 106. The metrics predictor under test 160 may include one or more executable modules that may be updated from time to time, as developers make changes to the module. The metrics predictor under test 160 may comprise a prediction model under test (PMUT) 162, which may also be updated by the developers. The PMUT 162 may be trained in the test environment 108 based on one or more sets of initial training data.

Figure 2:
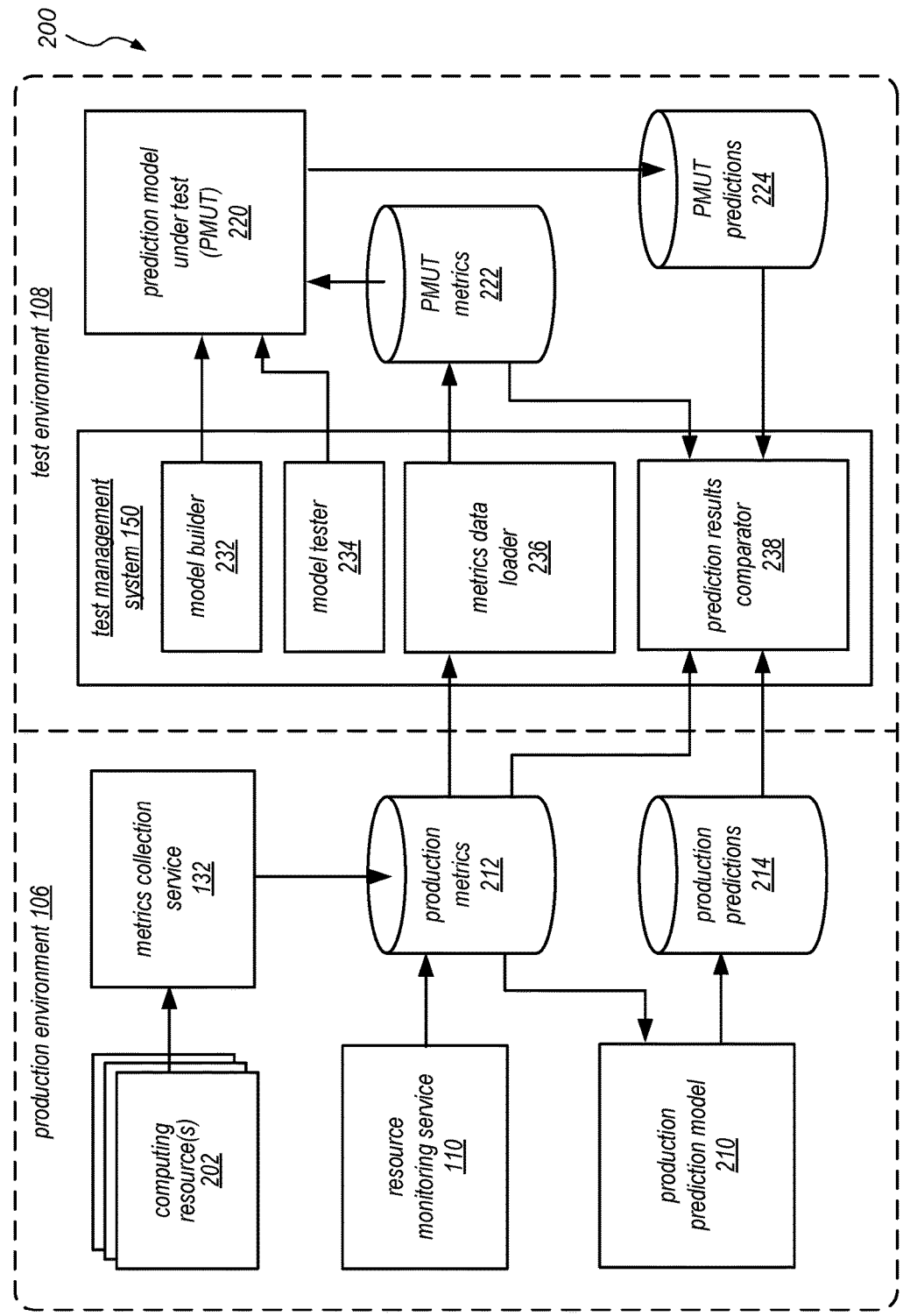
FIG. 2 is a block diagram illustrating an example computer system that implements prediction model testing, according to some embodiments.

FIG. 2 is a block diagram illustrating an example computer system that implements prediction model testing, according to some embodiments. The system 200 of FIG. 2 may include a production environment 106 and test environment 108, as discussed in connection with FIG. 1.

The production environment 106 may include a metrics collector 132, as discussed in connection with FIG. 1. The metrics collector 132 may collect usage or performance metrics data from the computing resources 202 in the production environment 106, and store the metrics the production metrics data store 212. The production metrics data store 212 may be a portion of the resource metrics data store 130 of FIG. 1.

The production environment 106 may include a resource monitoring service 110, as discussed in connection with FIG. 1. The resource monitoring service 110 may be implemented as a service, which may monitor the collected metrics data in the production metrics data store 212 for certain conditions. The conditions may be specified by clients of the service provider network. For example, clients of the service provider network may create alarms based on the metrics. The resource monitoring service 110 generate alarms in response to certain alarm conditions in the metrics data. For example, if the value of a metric exceeds a given threshold is detected for a specified number of time periods, an alarm may be triggered. The alarm may be sent to a registered list of interested modules or entities, which may perform one or more actions in response to the alarm.

The production environment 106 may include a production prediction service, which may be used to analyze collected metrics data and generate predictions for particular metrics in the future. The production prediction service may employ a production prediction model 210 to make predictions. The production prediction model 210 may a time-series prediction model that makes predictions based on historical data stored in a time series of data points. In some cases, the production prediction model 210 may generate prediction limits for an expected value to capture an uncertainty associated with a prediction value. As illustrated, the production prediction model 210 may use the metrics data stored in the production metrics data store 212 to make predictions, and the predictions may be stored in the production prediction data store 214. The prediction data store 214 may be a portion of the resource metrics data store 130 of FIG. 1.

Some prediction data may be generated for certain metrics by default as part of an ongoing monitoring process in the service provider network. Some other prediction data may be generated at the request of various clients of the service provider network. For example, a client may request, via a prediction service provide the services provider network, to track the latency of a particular virtual machine instance for a period of one week, based on the collected metrics data from that instance. The prediction service may make continuous predictions based on the collected metrics data, generating prediction values for the latency in regular times steps. Such prediction values may be stored in the production prediction data store 214, which may be accessible by the client via an application programming interfaces (API), a graphical user interface (GUI), or more sophisticated analysis tools.

The test environment 108 may operate alongside the production environment 106 to allow developers and testers to conduct tests for particular software modules, hardware modules, or configuration data or settings before they are deployed to the production environment 106. As discussed in connection with FIG. 1, the test environment 108 may replicate some of the computing resources and/or configuration settings of the production environment 106.

The test environment 108 may include a prediction model under test (PMUT) 220, a PMUT metrics data store 222, and a PMUT prediction data store 224, which correspond to the production prediction model 210, the production metrics data store 212, and production prediction data store 214 of the production environment 106, respectively. The PMUT 220, PMUT metrics data store 222, and PMUT prediction data store 224 may implement portions of a developmental version of a prediction service that is being tested in the test environment 108. Similar to their counterpart components in the production environment 106, the PMUT 220 may use the metrics data stored in the PMUT metrics data store 222 to make predictions, and the predictions may be stored in the PMUT prediction data store 224. The PMUT 220 may include one or more executable modules that may be updated from time to time, as developers make changes to the model.

Aspects of the test environment 108 may be controlled by a test management system 150. The test management system 150 may comprise one or more software modules implemented on one or more hardware computing resources, configured to carry out certain tasks specific to the test environment 108, as discussed in connection with FIG. 1.

The test management system 150 may include a model builder 232. The model builder 232 may be responsible for building an executable PMUT 220 from developer code and configuration data. The model builder 232 may automatically create PMUT 220 executables from a code base or data repository on a regular basis. The model builder 232 may be configured to create different versions of executables from different versions of code. The model builder 232 may generate a report or log of each build process, which may be used to track certain errors or alerts encountered during a build.

The test management system 150 may also include a model tester 234. The model tester 234 may be used to maintain and perform a series of tests on the PMUT 220. In some embodiments, the test cases in the model tester 234 may correspond to particular features sets in the prediction model being tested, and the test cases may be versioned according to versions of the code. In the context of prediction model testing, the model tester 234 may maintain test case metadata for one or more tests cases for the PMUT 220. A test case may comprise a set of time-series metrics data stored in the PMUT metrics data store 222. The model tester 234 may include a user interface, such as a GUI, a command shell, or a scripting language, that allows a user to perform a test manually. The model tester 234 may also implement an automation facility that allows one or more test cases to be run automatically, on a regular basis or under particular conditions. The model tester 234 may generate a report or log of a test, which may be reviewed by the tester or developer. In some embodiments, the results of a prediction model test are stored in the PMUT prediction data store 224. The model tester 234 may also take certain automatic actions based on the results of the testing. For example, the test management system 150 may specify a testing process for a software that includes a series of stages, and in the event that the software fails the tests at a first stage, the model tester 234 may preclude the model from being promoted to the next stage, and abort all subsequent testing stages.

The test management system 150 may provide the production metrics data stored in the production metrics data store 212 to modules in the test environment 108. The test management system 150 may provide a connection to the production metrics data store 212. Alternatively, the test management system 150 may copy the production metrics data to the test environment 106, using a metrics data loader 236. The metrics data loader 236 may be used to copy portions of the metrics data from the production metrics data store 212 to the PMUT metrics data store 222. The copying may occur in response to a manual command, or automatically upon the occurrence of certain conditions, or regularly in accordance with a specified schedule. The metrics data loader 236 may be implemented as a pull module that executes in the test environment 108, or a push module that executes at least partly in the production environment 106. Depending on the source and destination data stores, the metrics data loader 236 may be implemented using a number of different technologies, such as scripts, data-store-specific stored procedures; "extract, transform, and load" (ETL) tools, or any other suitable software tools.

In some embodiments, the production metrics data may be stored in the same format as the PMUT metrics data, and thus the metrics data loader 236 does not perform any reformatting of the metrics data during the copy. In other embodiments, some reformatting may be performed. For example, the production metrics data may be saved in a different type of data store as the PMUT metrics data store 222. As another example, the production metrics data may be saved in compressed or encrypted form, while the PMUT metrics data is not. In some cases, the metrics data loader 236 may remove or fill in some portion of the production metrics data, according user specifications. For example, the metrics data loader 236 may replace certain fields in the production metrics data with artificial or randomly generated values to facilitate testing.

Metrics data loader 236 may select certain data sets of the data stored in the production metrics data store 212 for testing. The metrics data loader 236 may include a user interfaces that allow a tester to browse existing production metrics data in the production metrics data store 212 and designate certain data sets to be copied. The metrics data loader 236 may automatically select one or more data sets to copy based on a set of prespecified criteria. In some embodiments, the selection process may include both an automatic identification of production metrics data that satisfies a set of criteria, and also a manual selection step to confirm a subset of metrics data to copy.

The test management system 150 may also include a prediction results comparator 238. The prediction results comparator 238 may be implemented as a separate module from the model tester 234, or be a part of the model tester 234. The prediction results comparator 238 may be used to perform a comparison of a set of production prediction errors generated by the production prediction model 210 and a set of test prediction errors generated by the PMUT 220. In some embodiments, when a set of metrics data is selected to be copied to the test environment 108, the test management system 105 may identify the production prediction data that is generated for that production metrics data in the production prediction data store 214. The PMUT 220 may then generate its predictions from the metrics data in the PMUT metrics data store 222, and store the prediction results in the PMUT prediction data store 224. The prediction results comparator 238 may then obtain the observed data from the production environment 106 that correspond to the test predictions generated by the PMUT 222. The prediction results comparator 238 may calculate test prediction errors between the observed data and the test predictions. The prediction results comparator 238 may also calculate production prediction errors between the production predictions generated by the production prediction model 210 and the observed data. In some cases, production prediction errors may already be generated in the production environment 106 for other purposes, and may be stored in the production prediction data store 214. If so, the prediction results comparator 238 may simply use those previously production prediction errors. The prediction results comparator 238 may then perform a comparison of the test prediction errors and the corresponding production prediction errors.

The prediction results comparator 238 may generate a report that indicates the differences between the test prediction errors and the corresponding production prediction errors. The report may be formatted as one or more files such as an extensible markup language (XML) file, or be stored in a data store such as the PMUT prediction data store 224. A single generated report file may correspond to a single test case for a given prediction model, and a full test of a prediction model may comprise a plurality of test cases and a plurality of report files.

The comparison report may include a series of delta values for the prediction errors between the production prediction model 210 and the PMUT 220 for each prediction made based on the time-series metrics data. The prediction results comparator 238, the metrics data loader 236, or some other portion of the test management system 150, may identify a set of subsequently observed metrics data in the production metrics data store 212 that corresponds to a set prediction data that was generated during testing. The prediction results comparator 238 may then compare the observed metrics data with both the production prediction data and the test prediction data to generate two set of prediction errors. The observed metrics data may be accessed in place from the production metrics data store 212, or copied into a data store in the test environment 108, such as the PMUT metrics data store 222 or the PMUT prediction data store 224.

In some embodiments, the comparison report may also indicate the numerical difference between the raw predictions of the two prediction models. For example, the comparison report may include differences between the expected values generated from PMUT 220 and the production prediction model at each prediction time step. The comparison may also include differences in one or more prediction limits for each prediction.

In some embodiments, the prediction results comparator 238 may calculate certain additional results or aggregate data based on the prediction data, and include these additional results and aggregate data in the comparison report. For example, the prediction results comparator 238 may determine the average prediction errors of the two models for the time series data. As another example, the prediction results comparator 238 may calculate the percentage of data points in observed data that fell within the respective prediction band for that data point. This percentage may be calculated for the predictions of both prediction models. In some embodiments, the prediction results comparator 238 may generate a composite score for the PMUT 220 based on a plurality of factors.

The prediction results comparator 238 may include a user interface, such as a GUI or an API, that allows a user or another software module to visualize or display the differences between the production prediction model and the test prediction model. In some embodiments, a GUI of the prediction results comparator 238 may display a graph showing the prediction values of the two prediction models and the observed metrics values. The GUI may include control elements that allow a user to indicate whether the displayed test case is a success or a failure.

In some embodiments, the prediction results comparator 238 may make programmatic determinations as to the outcome of a test case. For example, the prediction results comparator 238 may be configured with a prespecified tolerance value, so that if prediction errors of the PMUT 220 exceeds the tolerance, the test case is automatically deemed to be a failure. As another example, a "difference" tolerance may be specified such that, if the difference between the predictions or the prediction errors of the production prediction model 210 and the PMUT 210 diverges by more than the tolerance, the test case is deemed to be a failure. Such a tolerance may be useful in cases where the predictive behavior of a PMUT must be kept relatively close to the behavior of a production prediction model. The requirement ensures that when the PMUT is deployed in the production environment, it would not cause drastic or unexpected changes in the behaviors of modules and services that depend on the model's predictions, such as the alarm generation services. Thus, one aspect of the prediction model testing process may be to ensure that the prediction values of the PMUT does not deviate excessively from the prediction values of the production prediction model.

In some cases, the tolerance value may be dynamically selected, based on the type of metric or the type of prediction model. For example, when comparing the prediction results of a metric for storage capacity, which is a metric with relatively predictable behavior, a smaller tolerance value may be used. The prediction results comparator 238 may select different tolerance values for different types of metric types and prediction model types. The tolerance values may be adjusted via one or more user interfaces.

The result of a test case may be programmatically transmitted to the test management system 150, which may in turn take appropriate programmatic actions in response. For example, in the event that a test prediction model is determined to fail a test case, the test management system 150 may generate an alert to a developer, a tester, or another module in the test environment 108.

Although the above prediction model testing approach is explained herein using the exemplary system above, the details of the system itself is not intended to limit on the full breadth of the inventive concepts described herein. A person of ordinary skill in the art would recognize that the inventive concepts described herein may be implemented using numerous variations and combinations thereof without departing from the spirit of the inventive concepts.

Figure 3:
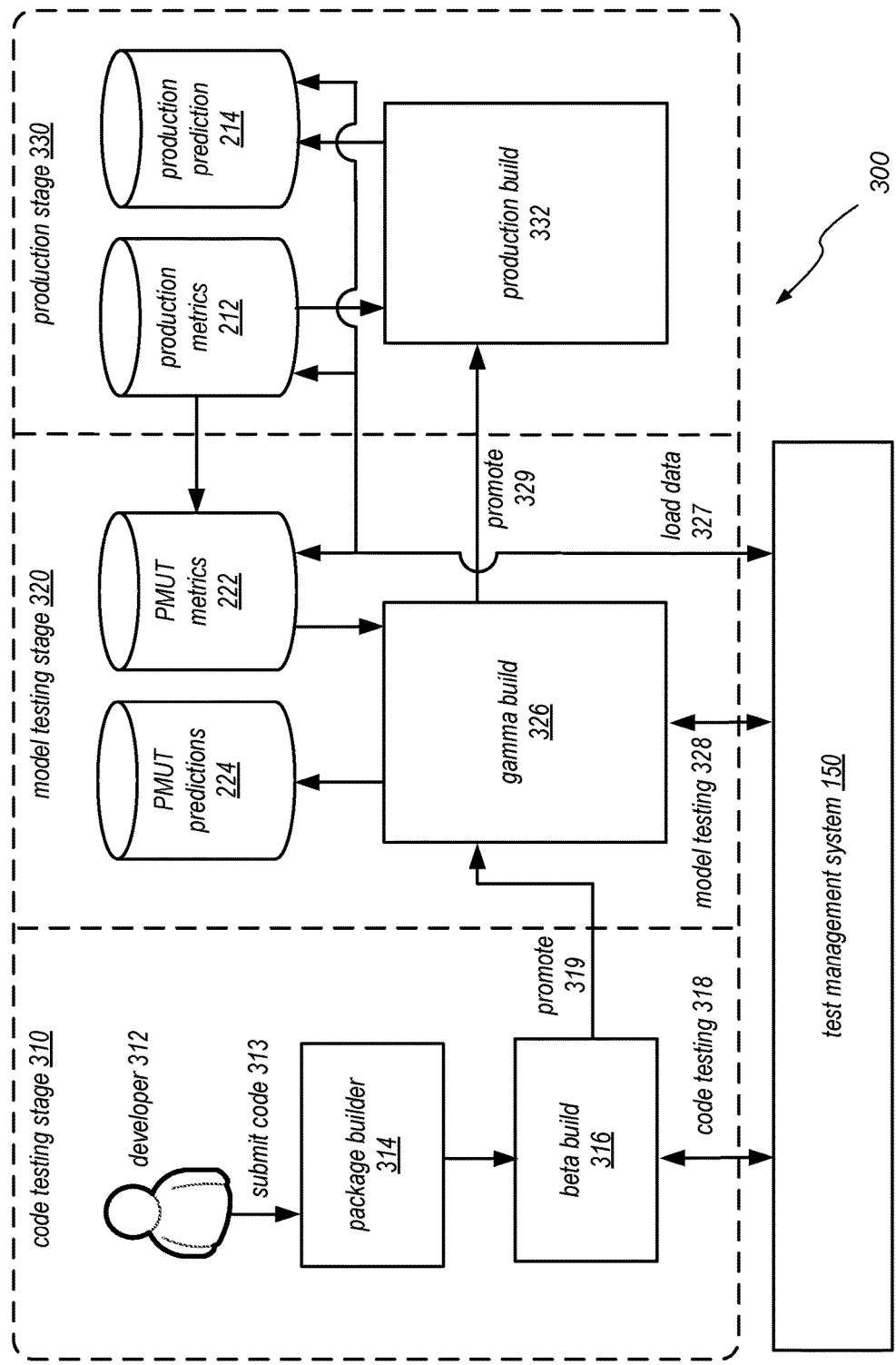
FIG. 3 is a diagram illustrating the operation of an example computer system that implements prediction model testing, according to some embodiments.

FIG. 3 is a diagram illustrating the operation of an example computer system that implements prediction model testing, according to some embodiments. The system 300 depicts a test environment in which a software module under testing goes through multiple testing stages. The depicted stages include a code testing stage 310, a model testing stage 320, and a production stage 330. The code testing stage 310 and model testing stage 320 may be controlled by a test management system, such as the test management system 150 discussed in connection with FIG. 1.

In the code testing stage 310, a developer 312 may submit code 313 for a software module to a code base. The software module may be associated with a prediction service as discussed in connection with FIG. 1. The prediction service may comprise a prediction model, such as the PMUT 220. The developer 312 may submit the code by for example checking in one or more files containing source code via a version control system.

The code testing stage 310 may include a package builder 314, which builds code in the code base into a beta build 316. The package builder 314 may be part of a software development environment, or the test management system 150, or both. The package builder 314 may perform a series of steps to convert human readable source code into machine readable code in a compilation process. The resulting machine readable code may comprise an executable that is natively executable on a machine of a particular type of physical processor, or an executable for a type of virtual machine, such as for example the Java™ Virtual Machine (JVM). The package builder 314 may also perform certain additional tasks to package the components of the executable package. Such additional tasks may include for example placing certain files in the correct folders in a package folder structure, generating and modifying configuration files and settings, and performing certain rudimentary tests to ensure that executable can launch properly, among other things.

The package builder 314 may produce a beta build 316, which may be an executable version of a prediction service containing the PMUT 220. In this stage, the test management system 150 may perform code testing 318 on the beta build 316 while developers and testers update the code base. The package builder 314 may perform the build process on a regular basis, for example once every night, to produce a new beta build 316. The build process may apply a suite of test cases maintained by the test management system 150, so as to ensure that each new beta build 316 passes all of the test cases. In the event that the build process encounters errors or alerts, the package builder 314 may log the errors or alerts, or transmit a message to particular developers or testers.

Once development on the code base is sufficiently complete and results from the testing are deemed acceptable, the test management system 150 may promote 319 the prediction service to the next stage, which is the model testing stage 320. In practice, this promotion may be carried out by updating a version of the code base to indicate that it is under testing at the next stage, such as a gamma stage, and rebuilding the code base using a different build configuration to a gamma test environment. In some cases, the promotion 319 may occur before the code testing stage 310 is fully completed. Thus, the code base may be opened to the model testing stage 320 even while testing continues in the code testing stage 310.

In the model testing stage 320, a gamma build 326 may be deployed to a gamma test environment. In some embodiments, the gamma test environment is in the same location as the beta test environment. In this stage, the test management system 150 may perform model testing 328 that focuses on the performance of the PMUT 220. The model testing 328 may entail running predictions on data in the PMUT metrics data store 222 using the gamma build 326. As discussed in connection with FIG. 2, the PMUT metrics data store 222 may be populated with a copy of a portion of the production metrics data obtained from a production metrics data store 212 in the production environment. The loading of data 327 may be accomplished by either granting access to the production metrics data in the test environment, or copying the production metrics data to the test environment. The loading of data 327 may be carried out by one or more modules in the test management system 150, such as the metrics data loader 326 or the prediction results comparator 238 of FIG. 2.

The results of the model testing may be stored in the PMUT prediction data store 224. Testing of the PMUT 220 may comprise running predictions a large number of test metrics data sets. Each data set may correspond to a separate test case. Different test cases may involve data for different metrics. The test cases may cover different time periods involving different sampling frequencies, and represent particular production data behaviors. As discussed in connection with FIG. 2, when each test case is completed, one or more modules in the test management system 150 may generate a comparison report indicating differences between the test prediction errors and the production prediction errors. In some embodiments, the raw prediction results from the two prediction models may be compared. The report may be analyzed manually or programmatically to determine whether the test case was a success or a failure.

In response to the test results at the model testing stage 320, prediction model developers may make adjustments to the PMUT 220. The adjustments may be made manually or programmatically based on automated tuning tools. In some cases, certain executables in the gamma build 326 may be updated using the package builder 314 during the model testing stage 320. Once the adjustments are made to create a new gamma build 326, the model test cases may be rerun. The model testing 327 process may continue until the development on the PMUT 220 is completed and results from the testing are deemed acceptable. At that point, the test management system 150 may promote 329 the prediction service and the PMUT 220 to the next stage, which may be the production stage 330. It should be noted that in some embodiments, additional testing stages may be implemented before or after the model testing stage 320. The model testing stage 320 described herein may be a modular stage in the testing process, and may appear anywhere in the testing pipeline.

In the production stage 330, the production build 332 is deployed to the production environment 106. The production build 332 may execute as part a production prediction service that operates over real world metrics data collected from the service provider network. Production data in the production metrics data store 212 and production prediction data store 214 may be copied or accessed to test later versions of prediction models. As discussed, in some embodiments, components and computing resources in the production environment 106 may operate without knowledge of the test environment 108.

Figure 4A:
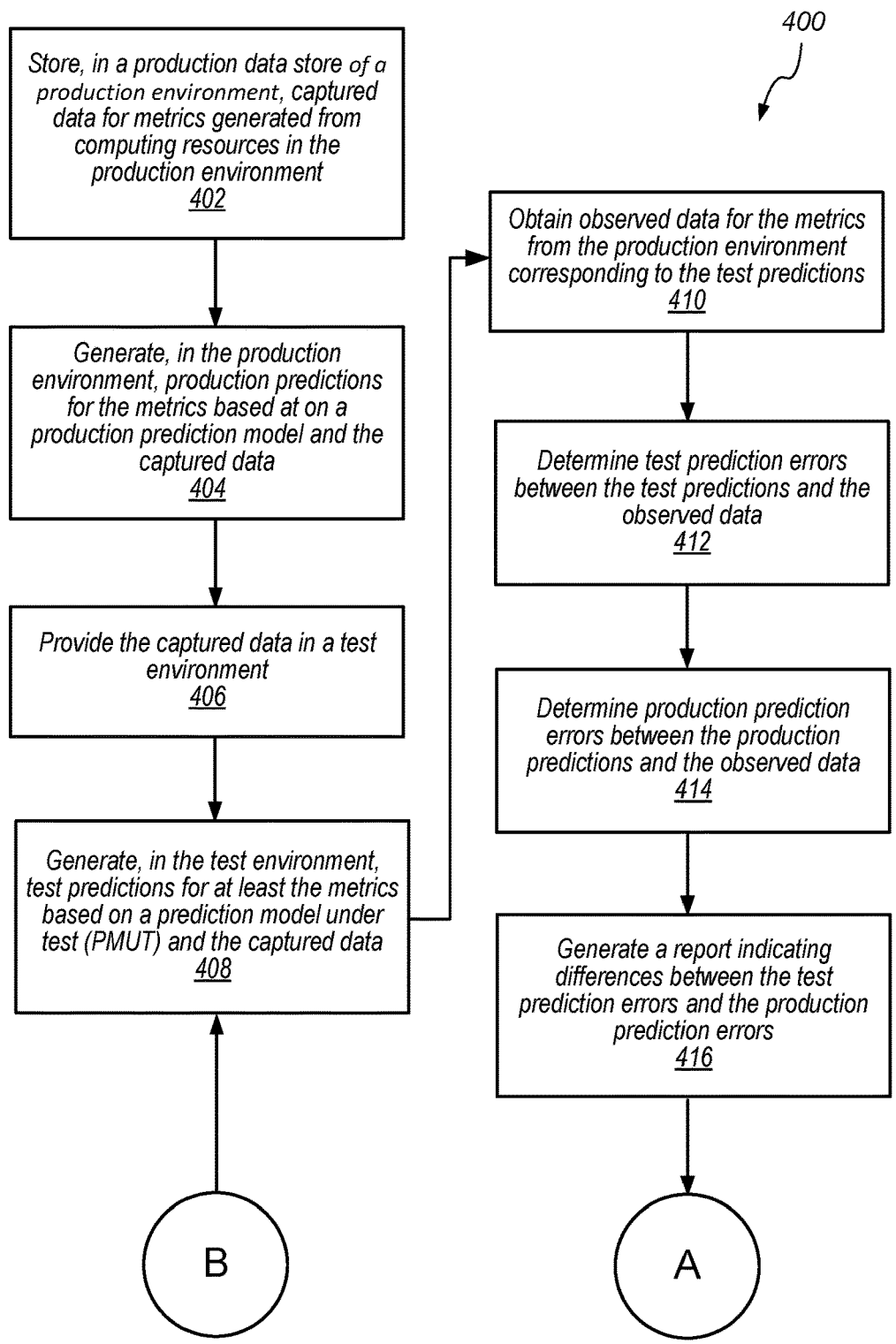
FIGS. 4A and 4B is a flowchart diagram illustrating a process of testing a prediction model, according to some embodiments.
Figure 4B:
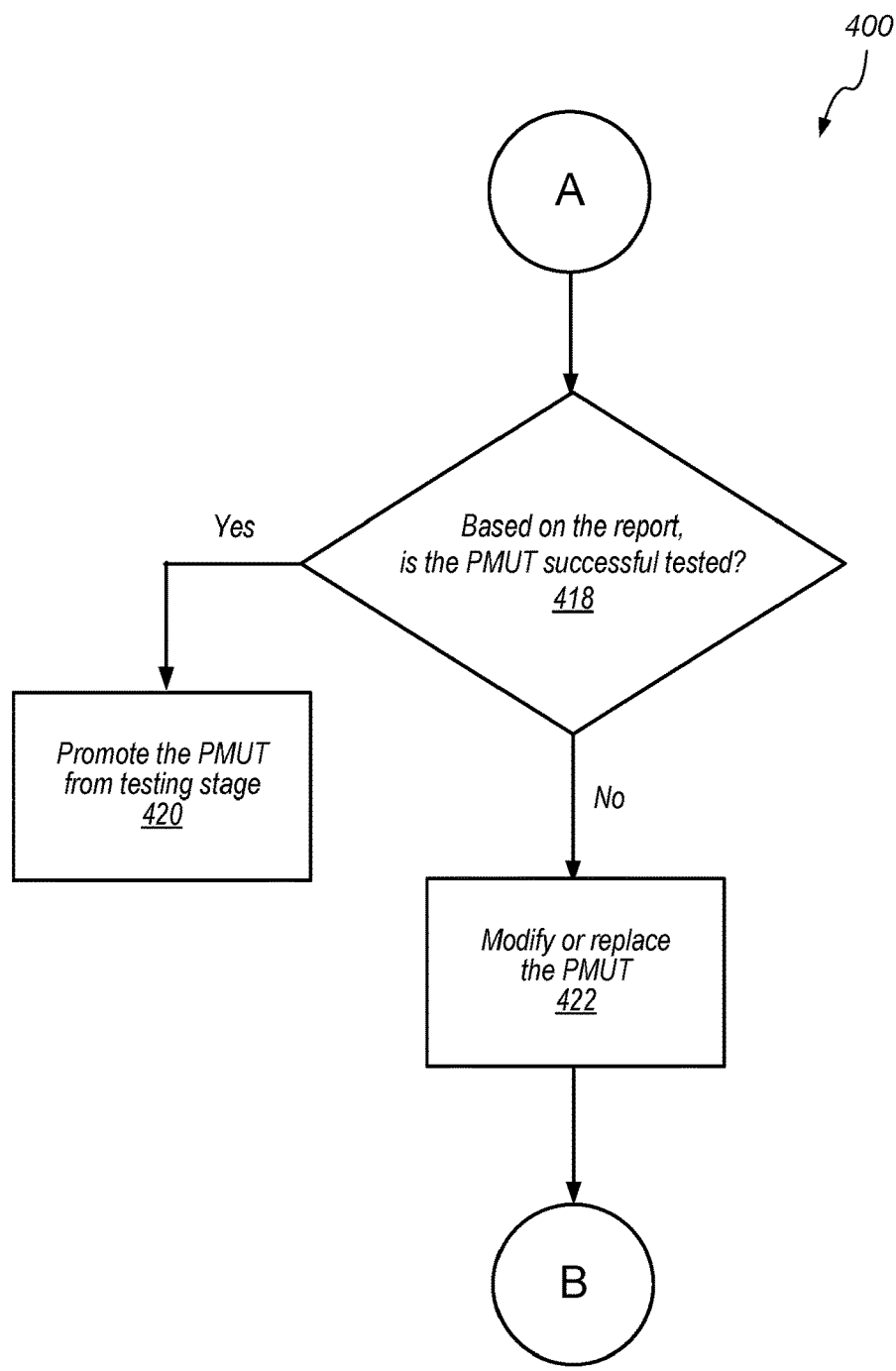

FIGS. 4A and 4B is a flowchart diagram illustrating a process of testing a prediction model, according to some embodiments. The operations of FIG. 4 may be carried out by the exemplary systems depicted in FIGS. 1-3, for example.

The process 400 begins at operation 402. At operation 402, captured data for one or more metrics generated from one or more computing resources in a production environment of a service provider network is stored in a production data store in the production environment. Operation 402 may be carried out by the metrics collection service 132 in FIG. 1. The metrics data may be generated from physical computing resources or virtual computing resources, which may include for example virtual machine instances.

At operation 404, production predictions for the one or more metrics are generated based on a production prediction model and the captured data in a production environment. Operation 404 may be carried out by a production prediction service, such as the metrics prediction service 140 of FIG. 1. The production prediction service may include a production prediction model 210. The generated predictions may be stored in the production prediction data store 214 of FIG. 2, which may be accessible to clients of the service provider network via one or more client interfaces.

At operation 406, the captured data is provided to a test environment. Operation 406 may be carried out by copying the captured data to the test environment using for example the metrics data loader 236 of FIG. 2, which may be a part of the test management system 150. The metrics data loader 236 may maintain settings and configurations that specify what production metrics data will be copied, and how and when the copying may occur. In some embodiments, the metrics data loader 236 may select particular computing resources for which metrics data are copied. The selection may be based on a set of criteria from developers or testers. For example, the criteria may specify that for testing purposes, only the metrics data for compute instances that have been relatively active should be copied for testing. The set of candidate computing resources may be determined from a query of the production metrics data store 210. In some cases, composite scores for computing resources may be computed based on a plurality of factors, and the computing resources with the highest scores are used for testing. In some cases, the selection of computing resources performed in part in a pseudo random fashion. Further, the captured data may be reformatted or modified during the copy. For example, the captured data may reside in a source database and be reformatted into one or more files. The operation may also remove or fill in some portion of the captured data to facilitate testing. The captured data may be stored in the PMUT metrics data store 222 of FIG. 2.

At operation 408, test predictions for at least a subset of the one or more metrics are generated in the test environment, based at least in part on a PMUT 220 and the captured data. Operation 408 may be carried out by the metrics prediction service under test 160 in of FIG. 1 and the model tester 234 of FIG. 2. In some embodiments, only a subset of the metrics copied from the production environment may be used to test the PMUT 220. For example, the model tester 234 may select certain metrics from the copied metrics data based on one or more criteria specified by the testers. Metrics may be selected to obtain an appropriate test case coverage for the PMUT 220. In some cases, the metrics may be selected in a pseudo random fashion. The test predictions that are generated may be stored in the PMUT prediction data store 224 in FIG. 2.

At operation 410, the observed data for the metrics corresponding to the test predictions are obtained. The observed data may be captured by the metrics collection service 132 in FIG. 1, similar to the captured data in operation 402. One or more modules in the test management system 150, for example, the metrics data loader 236 or the prediction results comparator 238, may determine the observed data in the production environment that correspond to the test predictions, and either grant access to the observed data or copy the observed data into a data store in the test environment, for example the PMUT metrics data store 222 or the PMUT prediction data store 224.

At operation 412, test prediction errors between the test predictions and the observed data are determined. Operation 412 may be performed by the prediction results comparator 238 of FIG. 2. A prediction error may comprise the numerical difference between a data point in the observed data and an expected value of that data point. A prediction error may also comprise an indicating of whether the data point is within the prediction band of the respective prediction.

At operation 414, production prediction errors between the production predictions and the observed data are determined. Operation 412 may be performed by the prediction results comparator 238 of FIG. 2. In some cases, production prediction errors may already be generated in the production environment 106 for other purposes, and may be stored in the production prediction data store 214. If so, the prediction results comparator 238 may simply use those previously production prediction errors.

At operation 416, a report indicating the differences between the test prediction errors and the production prediction errors is generated. Operation 416 may be carried out by the prediction results comparator 238 of FIG. 2. The report may include a series of prediction errors for each prediction generated by both the production prediction model 210 and the PMUT 220. In some embodiments, the report may also include delta values between the prediction parameters generated by the two prediction models. For example, the report may indicate the numerical difference between the expected values generated from the PMUT 220 and the production prediction model 210 at each prediction time step. The comparison may also include differences in one or more prediction limits for each prediction. In some embodiments, the prediction results comparator 238 may calculate certain additional results or aggregate data based on the prediction data, and these additional results and aggregate data may be included in the report. For example, the prediction results comparator 238 may determine the average prediction error for a time series of data for both prediction models. In some embodiments, the prediction results comparator 238 may generate a composite score or a recommendation for the PMUT 220, based on a plurality of factors.

At operation 418, a determination is made, based at least in part on the report, whether the PMUT 220 is successfully tested. Operation 418 may be carried out by the prediction results comparator 238 of FIG. 2. In some embodiments, the prediction results comparator 238 may programmatically make such a determination based on prespecified user criteria. For example, the prediction results comparator 238 may determine that the PMUT 220 is not successfully tested if the average test prediction error generated from the PMUT 220 is greater than a preset tolerance. In some embodiments, the decision may be left to a user, such as a developer or tester. In that case, the prediction results comparator 238 may present the report to the developer or tester via a GUI. The prediction results comparator 238 may display on the GUI a recommendation or composite score computed for the PMUT 220. The GUI may include control element that allow the user to indicate whether the PMUT 220 was successfully tested.

At operation 420, if it is determined that the PMUT 220 is successfully tested, the PMUT 220 may be promoted from a testing stage. Operation 420 may be performed by one or more modules in the test management system 150. The test management system 150 may manage various testing stages of software testing, as depicted in FIG. 3. The testing of the PMUT 220 may take place in one testing stage of an overall testing process. The promotion may be accomplished by updating a version of the code base for the PMUT 220 to indicate that it promoted past the testing stage.

At operation 422, if it is determined that the PMUT 220 is not successfully tested, the PMUT 220 may be modified or replaced. Operation 422 may be performed manually by testers or developers, who may manually adjust or replace the PMUT 220 in response to issues identified during the testing. Operation 422 may also be performed programmatically by an automatic tuner, which may be configured to programmatically adjust particular parameters or behaviors of the PMUT 220 based on the test results. One the modifications are complete, the process 400 cycles back to operation 408 to generate prediction data again. In some cases, the process 400 may cycle back to operation 406, to provide additional captured data from the production environment 106 for testing.

Figure 5:
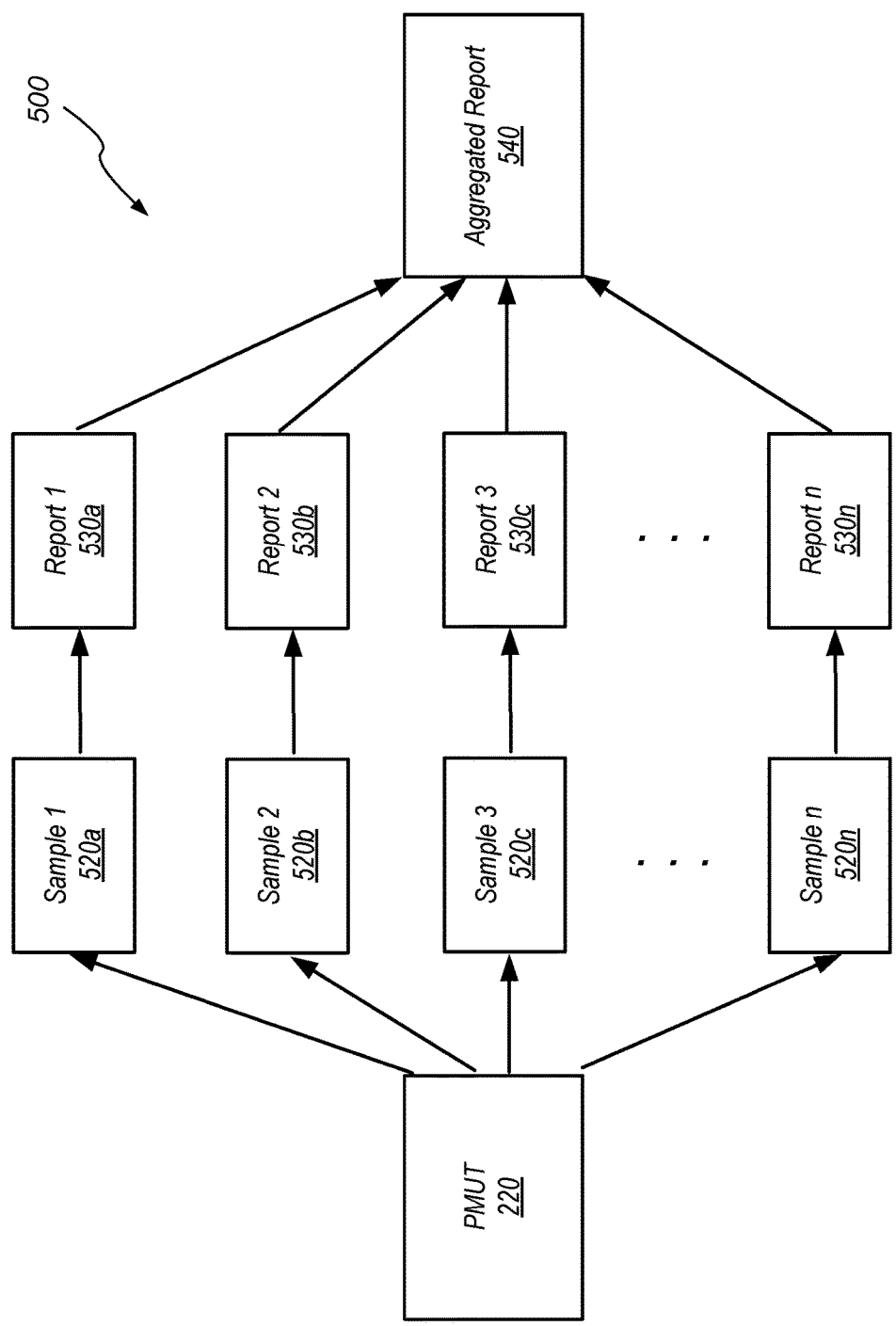
FIG. 5 is a diagram illustrating the operation of an example computer system that implements prediction model testing, according to some embodiments.

FIG. 5 is a diagram illustrating the operation of an example computer system that implements prediction model testing, according to some embodiments. FIG. 5 illustrates a scaling process in which a test prediction model may be used to generate multiple reports 530a-n, which may be aggregated to create an aggregate report 540. The operations in FIG. 5 may be performed by the model tester 234 and/or the prediction results comparator 238 in FIG. 2, which may be components of the test management system 150.

In some embodiments of the testing system described herein, scalability may become an important issue. In particular, as the number of metrics increase, it may be difficult to test the performance of the PMUT 220 on every metric. In some embodiments, the test management system 150 may not run prediction tests for every metric. Instead, the system may select a small proportion of the metrics from the entire set of metrics to run a more limited test. The selection may be governed by a test coverage policy that is specified by the tester or developer. In some cases, the selection of metrics may be performed in a pseudo random fashion. This selection and testing of subsets of metrics may be repeated multiple times to obtain adequate testing coverage.

As shown in FIG. 5, a PMUT 220 is applied to several metric data samples 520a-n. The samples 520a-n may be small sets of metrics data selected from the full set of metrics data stored in for example the PMUT metrics data store 222. The set of metrics in the samples 520a-n may be selected in a pseudo random fashion.

When the PMUT 220 is applied to each of the samples 520a-n, test prediction results for each sample is generated to for example the PMUT prediction data store 224. These test prediction errors may then be compared with corresponding production prediction errors, which were generated using the production prediction model. The comparison results may then be included in a series of respective reports 530a-n corresponding to the samples 520a-n. The reports 530a-n are then combined into an aggregate report 540 that includes all selected metrics. In this manner, the PMUT 220 may be sufficiently tested using an appropriate subset of metrics to determine its performance. Importantly, this process is scalable to situations where the production metrics data includes a very large number of metrics.

Figure 6:
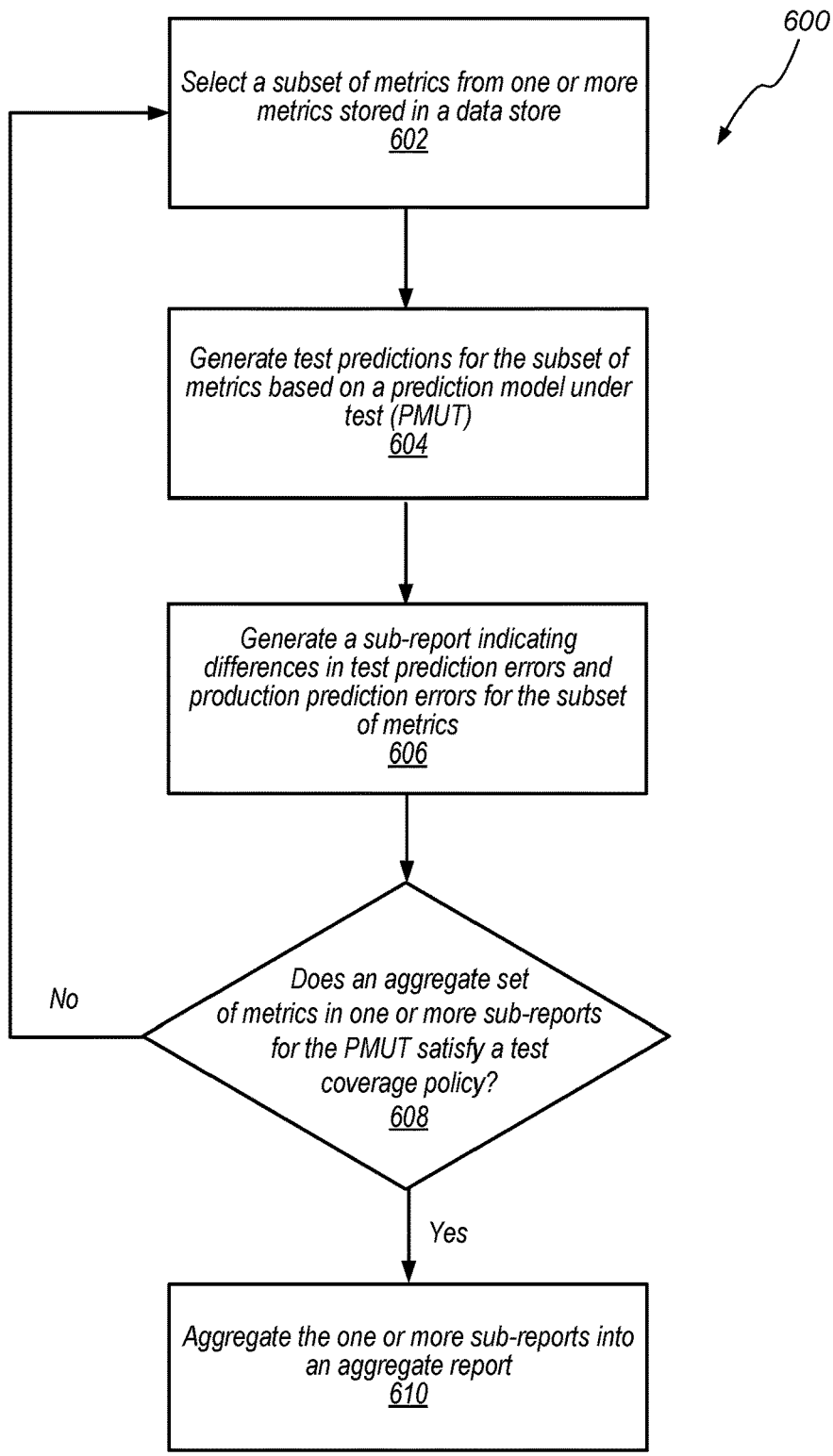
FIG. 6 is a flowchart diagram illustrating a process of testing a prediction model, according to some embodiments.

FIG. 6 is a flowchart diagram illustrating a process of testing a prediction model, according to some embodiments. The operations of process 600 may represent an addition or variation to process 400 depicted in FIG. 4. The process 600 may be performed by may be performed by the model tester 234 and/or the prediction results comparator 238 in FIG. 2. However, the operations of FIG. 6 may be used in testing system other than the system depicted in FIGS. 1-3.

At operation 602, a subset of metrics is selected from one or more metrics stored in a data store. The selected metrics may be used to test a prediction model such as the PMUT 220. The data store may be the PMUT metrics data store 222 in FIG. 2. The selection of the metrics subsets may be based on certain criteria in a test coverage policy specified by the developers or testers. For example, the selection criteria may specify that certain metrics, such as metrics related to a type of network traffic, must be selected together. In some cases, the test coverage policy may include a pseudo random criteria.

At operations 604, test predictions for the subset of metrics are generated based at least in part on a prediction model under testing. Operation 604 may be performed in a similar fashion to operation 408 in FIG. 4.

At operation 606, a sub-report indicating differences in test prediction errors and production prediction errors for the subset of metrics is generated. The test prediction errors and production prediction errors may be determined in a similar fashion to operations 410-414 in FIG. 4. However, in the process 600, the sub-report may only contain data for a subset of the metrics that are available to test the PMUT 220.

At operation 608, a determination is made whether an aggregate set of metrics in one or more sub-reports generated for the PMUT satisfy a test coverage policy. Process 600 may continue to generate sub-reports until sufficient metrics are included in the sub-reports to satisfy the test coverage policy. The test coverage policy may specify the minimum set of metrics that are needed for adequate coverage in the testing of the PMUT 220. For example, a test coverage policy may require that at least two metrics associated with CPU usage must be used to test the PMUT 220. The test coverage policy may also require particular types of metrics that exhibit particular data behavior to be included.

At operation 610, if it is determined that the aggregate set of metrics satisfies the test coverage policy, the sub-reports are aggregated into an aggregate report. Operation 610 may be performed by the prediction result comparator 238 in FIG. 2. The aggregated report may contain comparison results for all of the metrics in the sub-reports generated for the PMUT 220. The data from the sub-reports may be aligned so that data points for one time step are grouped together. However, the aggregated report may not contain all metrics that are stored in the PMUT metrics data store 222 that are available to test the PMUT 220. The aggregated report may contain only a sufficient number and types of metrics, in accordance with the test coverage policy, to test the performance of the PMUT 220.

On the other hand, if it is determined that the aggregated set of metrics does not satisfy the test coverage policy, the process 600 cycles back to operation 602, in which a new subset of metrics is selected. In this manner, the process 600 may continue to select subsets of metrics to test the PMUT 220 until the test coverage policy is satisfied.

In alternative embodiments, the selection of the subsets of metrics may be performed as an initial step. Thus, instead of making repeated determinations whether the test coverage policy is satisfied after the generation of each sub-report, the process may simply select all subsets of metrics to be used for testing before any predictions are run for the PMUT 220. This initial selection may be made based on the test coverage policy. In some embodiments, two or more sets of test predictions may be generated in parallel, using two different subsets of selected metrics. Two or more sub-reports may also be generated in parallel. Such parallelization may be implemented by the model tester 234 to speed up the process of testing.

FIG. 7 illustrates a report generated by a prediction model testing system, according to some embodiments. The report 700 may be generated in a variety of formats. For example, the report may be a file, which may be a binary file or, as illustrated, a text file. As another example, the report may be stored in a data store or database, such as the PMUT prediction data store 224 or the PMUT metrics data store 222. The report 700 may be formatted in a proprietary format that can be parsed and interpreted by the test management system 150.

The report 700 includes a title section 702, which indicates the prediction models that are being compared in the report. In this case, the prediction model under test M2 is being compared with a baseline prediction model M1. Prediction model M1 may be a production prediction model that is currently operating in a production environment. Alternatively, model M1 may be an earlier version of a prediction model under test.

Report 700 may include all the results of all test cases for all metrics for a PMUT. Alternatively, the report may be generated for only certain test cases, certain metrics, or certain prediction runs. As illustrated, report 700 shows one run for one metric 704, which is labeled "Page Swaps." However, report 700 may include a plurality of sections for a plurality of metrics.

Report 700 may include a section that shows prediction errors of models M1 and M2 for the metric in question. The error values may be the numerical difference between the expected value of the prediction and the actual value that was observed. The values may be shown in time series, with each time step corresponding to a prediction step used by models M1 and M2. In report 700, the individual times steps are shown as rows identified by a value under the Time column 710. Each row contains values for a number of fields. Field 712 is the error (or numerical difference between the expected value and the observed value) generated by model M2. Field 714 is a yes or no field indicating whether the observed data for that time step was within the prediction band generated by model M2. Fields 716 and 718 are similar to fields 712 and 714, except they represent values for the baseline model M1. Field 719 is the difference between the prediction errors of two models. In field 719, the difference is negative if the prediction error of the model under test M2 is less than the baseline model M1. Thus, a series of negative values in column 719 indicates that model M2 performed better than model M1.

Report 700 may also include a summary section 720. The summary section may include certain aggregate data or statistics calculated based on the time series values for the metric in question. For example, the statistic "M2 Avg Error" 722 shows the average error value for the model M2 over the entire time series period. In some embodiments, the average value may be normalized to a percentage. The statistic "M2 Max Error" 724 shows the maximum error value for the model M2 over the entire time series period. In some embodiments, the report 700 may indicate the particular time step where the maximum occurred. Statistics 726 and 728 are similar to statistics 722 and 724, except they show the average and maximum errors for the baseline model M1. As illustrated, the summary section 720 also includes two statistics M2 prediction in band percentage 730 and M1 prediction in band percentage 732. These two rows show the percentage of time steps where the observed value fell inside the prediction band that was generated by models M2 or M1. These statistics are another way of evaluating the performance of the prediction models.

A person of ordinary skill would understand that the report may include numerous other statistics that may aid in evaluating the performance of prediction models. The inventive concepts described herein are not limited to the particular statistics and/or formatting shown in report 700, which is merely illustrative. The report 700 may be generated in a variety of formats and include a variety of statistics, without departing from the spirit of the inventions disclosed herein.

Figure 8:
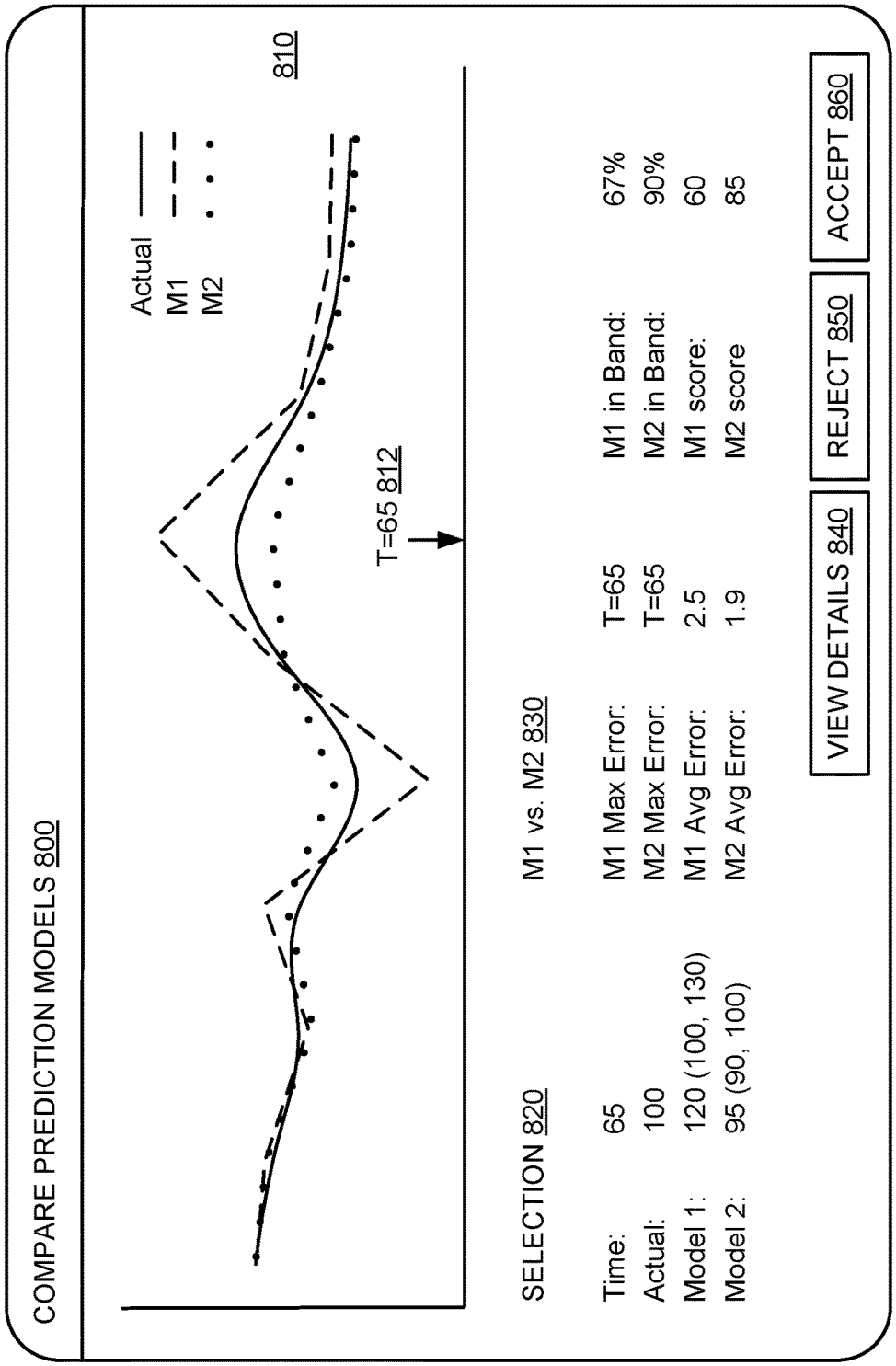
FIG. 8 illustrates a user interface of a prediction model testing system, according to some embodiments.

FIG. 8 illustrates a user interface of a prediction model testing system, according to some embodiments. FIG. 8 depicts a view 800 titled "COMPARE PREDICTION MODELS." View 800 may be displayed on a computing device with a graphical display. Such a computing device may be for example a device associated with a developer or tester of a prediction service.

The view 800 may include a top portion, which comprises a graph 810 of the prediction results produced by the baseline or production prediction model and the PMUT. As illustrated in legend on the top right corner of graph 810, the baseline or production prediction model is M1, and the prediction model under test is M2. The graph 810 may also show the observed data that is the subject of the two predictions. The observed data, baseline model predictions, and PMUT predictions may be shown together over a time graph. The data for graph 810 may be obtained by for example the prediction results comparator 238, which uses this data to produce the comparison report. In other embodiments, additional graphs may be displayed. For example, the view may include a time graph of the delta of prediction values between models M1 and M2. Such data may be provided by the prediction results comparator 238, or obtained from the comparison report generated by the prediction results comparator 238. In other embodiments, other or additional graphs may be displayed on the GUI. For example, a separate graph may display the prediction values or prediction errors of the two models. Such a graph may show, for example, the prediction error values in fields 712 and 716 in the report 700. The graph may also indicate various tolerance values used in the model evaluation process. For example, the graph may show a tolerance value for the value of the prediction error as a horizontal line on the graph. As another example, the graph may show a tolerance value for the difference between the prediction values or prediction errors of the two models M2 and M1, as a tolerance band around the curve for M1.

The graph 810 may also include a control element to allow the user to select a point in time on the time graph 810. As illustrated, the current selection 812 is at time point 65. More detailed data about the selected time 812 is shown on a bottom portion of the view 800.

As illustrated, the view 800 includes a bottom portion that displays various parameters that may be used to evaluate the prediction results. The view may include a selection section 820 that shows detailed data for the selected time point 812 on graph 810. Section 820 may show the selected time, and the observed value, and prediction values of the two prediction models M1 and M2 at the selected time. The prediction values of the prediction models may include the expected value and the upper and lower prediction limits, which may be shown in parenthesis. In some embodiments, the upper and lower prediction limits may be shown visually on the graph 810 as a prediction band. The parameters shown in section 820 may dynamically update as the user changes the selection 812 in the graph 810.

View 800 may also include a section 830 that shows certain aggregate performances statistics for the two models. As illustrated, section 830 shows the maximum errors for the two models, and the average errors for the two models, over the time series period. Section 830 also shows the percentages of time that the observed data fell within the prediction bands generated by the two prediction models. In addition, section 830 shows two scores for the two models M1 and M2, which may be computed based on a number of factors by the prediction results comparator 238. In some embodiments, the view may include a recommendation determined by the prediction results comparator 238 indicating whether the test of model M2 was successful.

As illustrated, the view 800 may also include a number of control elements, such as buttons 840, 850, and 860. These control elements may allow the user to control various aspects of the GUI, to add analytical input to a test case, and to perform actions within the test management system 150.

For example, the rejection button 850 may indicate to the test management system 150 that the comparison results for the shown test case indicates a failure, and the accept button 860 may indicate that the comparison for the shown test indicates a success. The button 840 may allow the user to view additional statistics for the test case. In some embodiments, the button 840 may allow the user to directly view the comparison report generated by the prediction results comparator 238. In some embodiments, the button 840 may allow the user to view a recommendation as to whether the test case was a success or a failure, which may be programmatically generated by the prediction results comparator 238.

A person of ordinary skill would understand that the GUI may include a variety of different elements that may aid in evaluating the performance of prediction models. The inventive concepts described herein are not limited to the particular statistics, graphs, or control elements shown in view 800, which is merely illustrative. The view 800 may be generated in a variety of ways and include a variety of statistics, graphs, and/or control elements, without departing from the spirit of the inventions disclosed herein.

Figure 9:
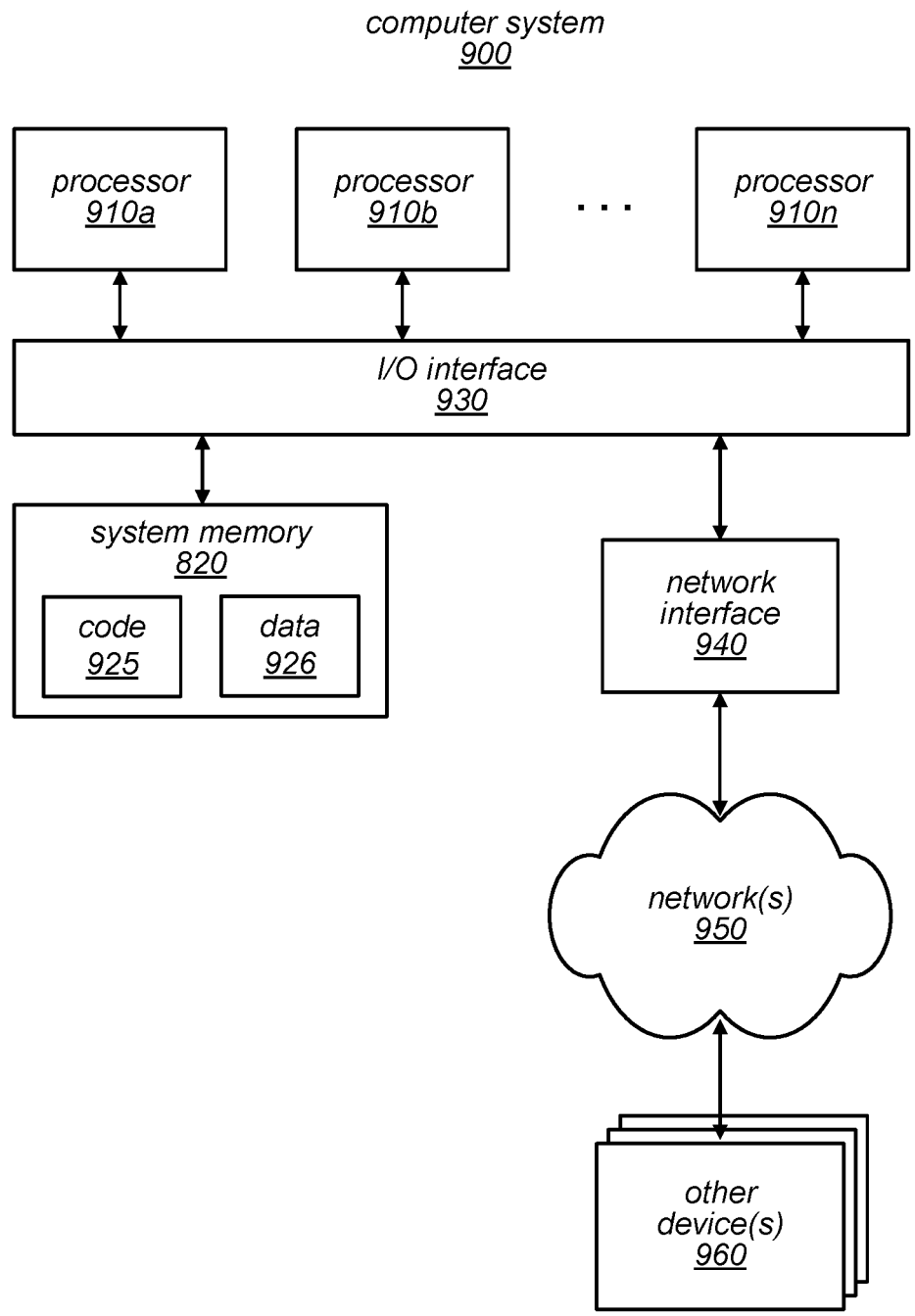
FIG. 9 is a block diagram illustrating an example computer system that can be used to implement one or more portions of a prediction model testing system, according to some embodiments.

FIG. 9 is a block diagram illustrating an example computer system that can be used to implement one or more portions of a metrics prediction system, according to some embodiments. Computer system 900 may include or be configured to access one or more nonvolatile computer-accessible media. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices, such as routers and other computing devices, as illustrated in FIGS. 1 through 7, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 7 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system comprising:
a metrics collector implemented by one or more computing devices comprising one or more hardware processors and memory configured to:
capture data for one or more metrics generated from one or more computing resources in a production environment of a service provider network; and
store the captured data in the production environment;
a production predictor implemented by one or more computing devices comprising one or more hardware processors and memory configured to:
generate, in the production environment, production predictions for the one or more metrics based at least in part on a production prediction model and the captured data; and
a test manager implemented by one or more computing devices comprising one or more hardware processors and memory configured to:
provide the captured data in a test environment;
generate, in the test environment, test predictions for at least a subset of the one or more metrics based at least in part on the prediction model under test (PMUT) and the captured data; and
obtain observed data for the one or more metrics from the production environment corresponding to the test predictions;
determine test prediction errors between the test predictions and observed data for the one or more metrics from the production environment corresponding to the test predictions;
determine production prediction errors between the production predictions and the observed data; and
generate a report indicating differences between the test prediction errors and the production prediction errors.

2. The system of claim 1, wherein:
at least one computing resource of the one or more computing resources in the service provider network is a virtual machine instance hosted by one or more virtual machine hosts, and
at least one metric of the one or more metrics is generated from operation of the virtual machines instance.

3. The system of claim 1, wherein to generate the report, the test manager is configured to generate in the report differences in one or more respective numerical values of the test predictions and the production predictions.

4. The system of claim 1, wherein the test manager is configured to:
transmit information from the report to a client device via a graphical user interface (GUI); and
receive input via the GUI indicating whether a test of the PMUT was successful or unsuccessful.

5. The system of claim 4, wherein the test manager is configured to:
generate a determination of whether the test of the PMUT was successful or unsuccessful based at least in part on information from the report; and
transmit a recommendation to the client device via the GUI recommending whether or not to promote the PMUT from a testing stage managed by the test manager.

6. A method, comprising:
providing captured data in a test environment, the captured data comprising data for one or more metrics generated from operation of one or more computing resources in a production environment;
generating, in the test environment, one or more test predictions for at least a subset of the one or more metrics based at least in part on a prediction model under test (PMUT) and the captured data; and
obtaining observed data for one or more metrics from the production environment corresponding to the test predictions;
determining test prediction errors between the test predictions and the observed data;
determining production prediction errors between production predictions and the observed data, the production predictions generated in a production environment based at least in part on a production prediction model and the captured data; and
generating a report indicating differences between the test prediction errors and the production prediction errors.

7. The method of claim 6, further comprising:
storing the captured data in a production metrics data store; and
wherein providing the captured data in the test environment comprises copying the captured data from the production metrics data store to a metrics data store (PMUT data store).

8. The method of claim 7, wherein copying the captured data from the production metrics data store to the PMUT data store comprises reformatting the captured data.

9. The method of claim 6, wherein generating the report comprises generating in the report differences in one or more respective numerical values of the test predictions and the production predictions.

10. The method of claim 6, further comprising:
determining, based at least in part on the report, that the differences between the test prediction errors and the production prediction errors are within a tolerance; and
indicating to a test management system that a test of the PMUT was successful.

11. The method of claim 10, further comprising selecting a value for the tolerance based at least in part on a type of a metric in the report.

12. The method of claim 6, further comprising:
during a testing stage:
modifying or replacing the PMUT to create a new PMUT;
generating a new report using the new PMUT;
determining, based at least in part on the new report, whether the new PMUT is successfully tested; and promoting the new PMUT from the testing stage based at least in part on the determination that the new PMUT is successfully tested.

13. The method of claim 6, further comprising:
transmitting information from the report to a client device via a graphical user interface (GUI); and
receiving input via the GUI indicating whether a test of the PMUT was successful or unsuccessful.

14. The method of claim 6, wherein generating the one or more test predictions comprises:
selecting one or more subsets of metrics from the one or more metrics; and
generating test predictions for the one or more subsets of metrics; and
wherein generating the report comprises:
generating one or more sub-reports indicating differences between test prediction errors and production prediction errors for respective ones of the one or more subsets of metrics;
determining that an aggregate set of metrics included in the one or more sub-reports for the PMUT satisfies a test coverage policy; and
aggregating the one or more sub-reports to produce the report.

15. The method of claim 14, wherein test predictions for at least two of the one or more subsets of metrics are generated at least partly in parallel.

16. A non-transitory computer-accessible storage medium storing program instructions that when executed on one or more processors cause the one or more processors to:
providing captured data from a production data store, the captured data comprising data for one or more metrics generated from operation of one or more computing resources in a production environment;
generate, in a test environment, one or more test predictions for at least a subset of the one or more metrics based at least in part on a prediction model under test (PMUT) and the captured data; and
obtaining observed data for the one or more metrics from the production environment corresponding to the test predictions;
determining test prediction errors between the test predictions and the observed data;
determine production prediction errors between production predictions and the observed data, the production predictions generated in the production environment based at least in part on a production prediction model and the captured data; and
generating a report indicating differences between the test predictions and the production predictions.

17. The non-transitory computer-accessible storage medium of claim 16, wherein to provide captured data in a test environment, the program instructions when executed on the one or more processors cause the one or more processors to copy the captured data from the production data store to a metrics data store.

18. The non-transitory computer-accessible storage medium of claim 16, wherein generating the one or more test predictions comprises:
selecting one or more subsets of metrics from the one or more metrics; and
generating test predictions for the one or more subsets of metrics; and
wherein generating the report comprises:
generating one or more sub-reports indicating differences between test prediction errors and production prediction errors for respective ones of the one or more subsets of metrics;
determining that an aggregate set of metrics included in the one or more sub-reports for the PMUT satisfies a test coverage policy; and
aggregating the one or more sub-reports to produce the report.

19. The non-transitory computer-accessible storage medium of claim 18, wherein the program instructions when executed on the one or more processors cause the one or more processors to perform said selecting the one or more subsets of metrics based at least in part on a selection criterion in a test coverage policy.

20. The non-transitory computer-accessible storage medium of claim 18, wherein the program instructions when executed on the one or more processors cause the one or more processors to perform said selecting the one or more subsets of metrics based at least in part on a pseudo random selection criterion.

* * * * *